G. T. PARRY.
ANTI FRICTION ROLLER.
No. 9,912.  Patented Aug. 2, 1853.
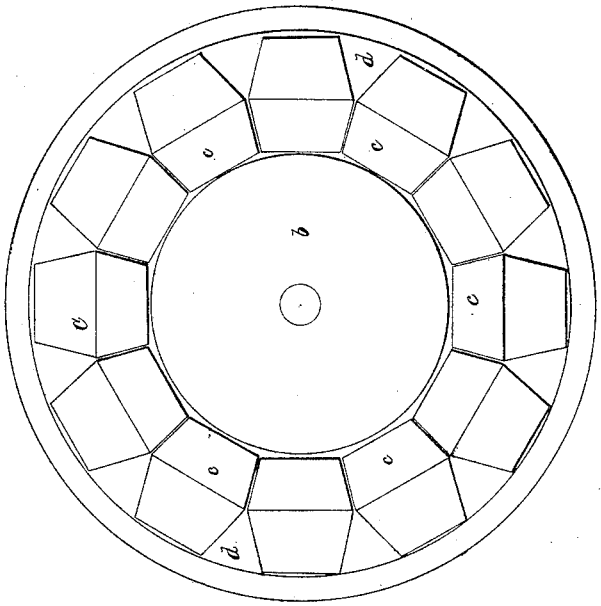
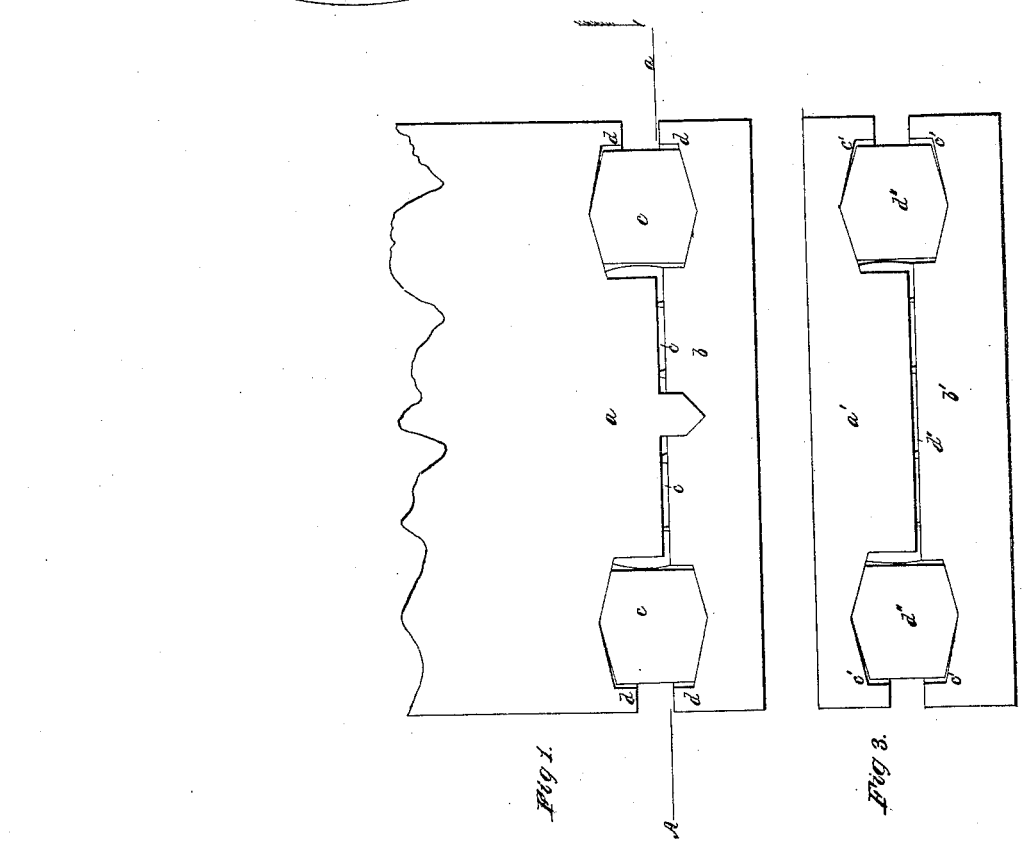

UNITED STATES PATENT OFFICE.

GEO. T. PARRY, OF SPRING GARDEN, PENNSYLVANIA, ASSIGNOR TO JOHN RICE.

ANTIFRICTION-BOX.

Specification of Letters Patent No. 9,912, dated August 2, 1853.

*To all whom it may concern:*

Be it known that I, GEORGE T. PARRY, of Spring Garden, Philadelphia county, Pennsylvania, have invented a new and useful Improvement in Antifriction-Rollers for the End Bearings of Shafts, Turn-Tables of Railroads, Platforms, &c., and that the following is a full, clear, and exact description thereof, reference being had to the accompanying drawings, making part of this specification, in which—

Figure 1, is a vertical section of the step of a vertical shaft with my improvement applied; Fig. 2, a horizontal section thereof taken at the line A, $a$, of Fig. 1—and Fig. 3, is a vertical section of my improvement as applied to a turn table.

Same letters indicate like parts in Figs. 1 and 2.

It has long been tried to reduce the end frictions of shafts, as also the friction of turning tables and other turning platforms by the interposition of anti-friction rollers but without practical success. Cylindrical rollers will not answer the purpose for the reason that they must slip to travel around the center of the shaft, the axis of the rollers being at right angles to the axis of the shaft or platform. To avoid this, the rollers have been made in the form of frustums of cones, but this would not answer for the reason that the weight or pressure of the beveled surfaces, would force the conical rollers outward, and thus make them bind and impinge against the outer casing surrounding them. And finally, the rollers have been made spherical running in grooves representing in the cross sections nearly segments of the circle of the spheres; but this also failed for the reason that a sufficient amount of bearing surface cannot be obtained without giving too great an amount of slipping and rubbing surface.

By my improvement I avoid the objections to the above plans, and the nature of my said invention consists in the employment of a series of rollers made in the form of double frustums of cones united at their bases, and adapted to run in grooves of nearly corresponding form made in the surfaces between which they are interposed.

The inner frustums of the rollers, and the corresponding parts of the surfaces of the grooves between which they are interposed, are made on bevels proportioned to the diameter of the rollers and the grooves in which they run, such as would represent the pitch lines of bevel cog-wheels of the same proportions. This will insure the rolling of the rollers about a common center without slip. And to prevent the said rollers from being wedged outward, or forced out of their proper paths, the outer ends of the rollers are made of reversed frustums, with the surface of the grooves nearly of a corresponding bevel, so that when the rollers are in place between the two surfaces, they—the surfaces—shall be in contact with the inner frustums of the rollers throughout their length, but the said surfaces instead of being in contact with the outer frustums, deviate a little from it, by which combination the rollers are prevented from being forced out of their true path and hence roll around, bearing the weight on the surface of the inner frustum, thus avoiding the practical objections to the methods heretofore practised.

In Figs. 1 and 2 of the accompanying drawings $a$ represents the lower extremity of a shaft, and $b$ a step or box. Between these two are interposed a series of rollers $c$, each in the shape of two frustums of cones united at the bases. The end of the shafts $a$, and the surface of the step $b$ are formed with concentric grooves $d$, $d$, of the same capacity but inverted. The width of the grooves should be a little greater than the entire length of each roller, that they—the rollers—may have a slight end play without coming in contact with the sides of the grooves. The inner frustums of all the rollers, and the bevel of the grooves in the end of the shaft, and the surface of the step should be on lines coinciding with the axis of the rollers and of the shaft, as in determining the pitch lines of bevel cog-wheels, so that as the shaft turns and the series of rollers are carried around, they shall by their conical form travel in a circle of which the axis is the center. The outer frustums of the rollers should be the reverse of the inner frustums, but slightly more abrupt, or the surface of the grooves in which this part of the rollers run should be slightly flattened, so that the outer frustums will run in contact with the surface of the grooves at the base, and be very slightly separated at the outer end.

From the foregoing it will be seen that as the shaft rotates, all the rollers will travel around the axis of the shaft without slip, and the tendency to force the rollers out of the true circle by the pressure and weight acting on them is resisted by the outer and inverted conical surface, so that by this means the rollers are kept in place, and travel in a circular path around the axis of the shaft, thus avoiding slip and the friction consequent thereon, except the small part of the surface of the outer frustums where the slip and friction must be very slight as it only takes place near the base, and simply to keep the rollers in place.

In Fig. 3, of the accompanying drawings the principle of my invention is represented as applied to a turning table for rail roads, where $a'$, is the turntable, and $b'$ the base, the two being formed with grooves $c'$, $c'$ to receive the rollers $d'$ in the form of double frustums as above described.

It will be obvious from the foregoing that the principle of my invention can be applied to any turning platform, or to shafts, whether vertical, horizontal or inclined, and either to the ends of the shafts or to flanches or shoulders projecting therefrom, and when applied to horizontal shafts &c., such as propellers, the object is to reduce the friction and wear due to end thrusts.

I do not claim as my invention the employment of conical rollers traveling around in grooves, as a means of reducing friction on the ends of shafts, and underturning platforms when the rollers are in the form of single frustums, as this has long been known, but What I do claim as my invention and desire to secure by Letters Patent is—

Making the rollers in the form of double frustums reversed, and united at their bases and traveling in circular grooves of nearly corresponding form in the surfaces between which the rollers are interposed, substantially in the manner and for the purpose herein specified.

GEORGE T. PARRY.

Witnesses:
 W. G. CONROW,
 JAMES SPENCELEY.